United States Patent
Boorom et al.

(10) Patent No.: US 6,578,167 B2
(45) Date of Patent: *Jun. 10, 2003

(54) DIGITAL COMPONENT TEST APPARATUS, AN APPARATUS FOR TESTING ELECTRONIC ASSEMBLIES AND A METHOD FOR REMOTELY TESTING A PERIPHERAL DEVICE HAVING AN ELECTRONIC ASSEMBLY

(75) Inventors: Kenneth F. Boorom, Boise, ID (US); Jonathan L. Dodge, Spokane, WA (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/369,750

(22) Filed: Aug. 6, 1999

(65) Prior Publication Data

US 2003/0041286 A1 Feb. 27, 2003

(51) Int. Cl.⁷ .................... G01R 31/27; H03K 19/003
(52) U.S. Cl. ........................... 714/727; 714/30
(58) Field of Search ............... 714/724–727, 714/324–327, 30; 370/242

(56) References Cited

U.S. PATENT DOCUMENTS

| | | | |
|---|---|---|---|
| 5,281,864 A | 1/1994 | Hahn et al. | 307/272.2 |
| 5,450,414 A | 9/1995 | Lin | 371/22.3 |
| 5,497,378 A | 3/1996 | Amini et al. | 371/22.3 |
| 5,596,585 A | 1/1997 | Njinda et al. | 371/22.5 |
| 5,691,991 A | 11/1997 | Kessler et al. | 371/22.3 |
| 5,737,340 A | 4/1998 | Tamarapalli et al. | 371/22.5 |
| 5,884,073 A * | 3/1999 | Dent | 709/222 |
| 5,935,242 A * | 8/1999 | Madany et al. | 713/1 |
| 5,974,567 A * | 10/1999 | Dickson, Jr. et al. | 713/1 |
| 6,119,247 A * | 9/2000 | House et al. | 345/705 |
| 6,195,774 B1 * | 2/2001 | Jacobson | 714/725 |
| 6,282,567 B1 * | 8/2001 | Finch, II et al. | 707/10 |
| 6,282,674 B1 * | 8/2001 | Patel et al. | 714/30 |
| 6,393,591 B1 * | 5/2002 | Jenkins, IV et al. | 714/725 |

* cited by examiner

*Primary Examiner*—Albert Decady
*Assistant Examiner*—Cynthia Britt

(57) ABSTRACT

A digital component test apparatus is provided. The apparatus includes a network environment, a client computer, a server computer, a device and an application program. The client computer is operatively connected with the network environment. The server computer is operatively connected with the network environment. The device has an electronic assembly and an interface port. The interface port is configured to connect the client computer with the electronic assembly. The application program is transferred from the network server to the client computer via the network. The application program includes a boundary scan test procedure operative to test operation of the electronic assembly. A method for remotely testing a peripheral device having an electronic assembly is also provided.

20 Claims, 4 Drawing Sheets

| SIGNAL NAME | DRIVEN BY PARALLEL PORT SIGNAL | INPUT/OUTPUT TO FORMATTER |
|---|---|---|
| TDO | nFAULT | OUTPUT |
| TDI | DATA(0) | INPUT |
| TCLK | DATA(1) | INPUT |
| TMS | DATA(2) | INPUT |
| TRST | DATA(3) | INPUT |
| DONE | DATA(7) | INPUT (ASSERT HIGH WHEN BOUNDARY SCAN IS COMPLETE) |

FIG. 3

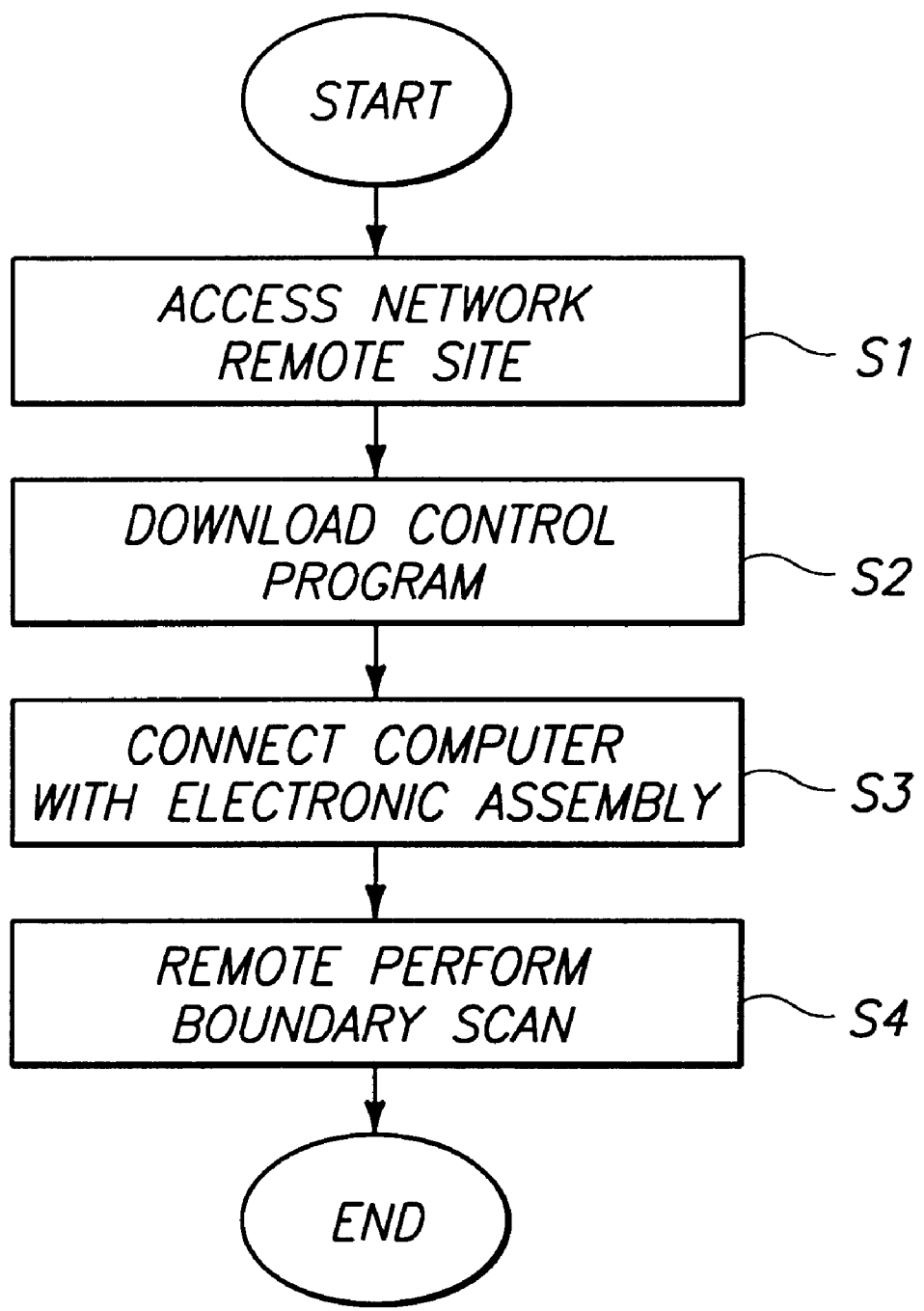

DIGITAL COMPONENT TEST APPARATUS, AN APPARATUS FOR TESTING ELECTRONIC ASSEMBLIES AND A METHOD FOR REMOTELY TESTING A PERIPHERAL DEVICE HAVING AN ELECTRONIC ASSEMBLY

FIELD OF THE INVENTION

This invention relates to the field testing of electronic assemblies within customer products, and more particularly, to built-in self-test methodologies for testing electronic components within peripheral devices such as printers.

BACKGROUND OF THE INVENTION

There presently exist techniques for testing electronic assemblies using relatively expensive external test equipment. Over the years, integrated circuits (ICs) have become an important part of many devices and electronic assemblies. It is desirable to identify defective interconnections, circuit pathways and junctions in a circuit device by testing circuit devices in order to identify such problems. A number of techniques have been developed to test such circuit devices.

One such technique employs the use of built-in self-test (BIST) circuitry which can be fabricated directly onto circuit devices such as integrated circuits. Built-in self-test (BIST) comprises signature analysis that provides a design-for-testability technique. However, additional logic in the form of linear feedback shift registers is needed to automatically generate pseudo-random test vectors. Output responses are compressed to form single vectors that are compared to a known good vector. When the output response vector does not match the known good vector, the design is considered faulty. However, a relatively large number of pseudo-random test vectors need to be exercised in order to ensure that an acceptably small chance of false positive results is realized.

Another technique for testing circuit components is called boundary scan. Boundary scan provides a technique for testing electronic assemblies. For example, a piece of test equipment can be connected to an electronic assembly such that verification can be made to show that all the digital components are in place, connected, and functioning properly. Boundary scan has been defined for testing integrated circuits (ICs) on printed circuit boards. Boundary scan imposes design discipline on printed circuit board components, including integrated circuits (ICs). Input/Output (I/O) pins on the integrated circuits can be connected into scan chains, with each integrated circuit containing scan registers between the I/O pins and a core logic which enables the printed circuit board test bus to control and observe the behavior of individual integrated circuits.

Further details of boundary scan testing can be found in U.S. Pat. Nos. 5,497,378 and 5,691,991 issued to International Business Machines Corporation, and various papers referenced therein. One accepted standard is described and fully documented in IEEE/ANSI Standard 1149.1-1990 Test Access Port and Boundary-Scan Architecture, herein incorporated by reference as illustrating the present understanding in the art. However, existing methods of boundary scan require expensive, special purpose equipment and software. For example, a typical implementation requires a relatively high investment in the range of $10,000–$200,000 (USD), which limits the number of applications where such implementation is cost-effective and/or feasible.

Therefore, there exists a need for an improved apparatus and method for testing electronic assemblies via boundary scan techniques wherein the need for special purpose equipment is eliminated and the implementation cost is reduced.

SUMMARY OF THE INVENTION

A technique is disclosed for performing boundary scan on devices that have an interface port, such as a parallel port connector, following the signaling scheme provided in IEEE Standard 1284. Such technique comprises an apparatus and a method for testing electronic assemblies that uses software on a host computer to control a circuit board of the electronic assembly in order to implement a boundary scan operation.

According to one aspect, a digital component test apparatus is provided. The apparatus includes a network environment, a client computer, a server computer, a device and an application program. The client computer is operatively connected with the network environment. The server computer is operatively connected with the network environment. The device has an electronic assembly and an interface port. The interface port is configured to connect the client computer with the electronic assembly. The application program is transferred from the network server to the client computer via the network. The application program includes a boundary scan test procedure operative to test operation of the electronic assembly.

According to another aspect, an apparatus is provided for testing electronic assemblies. The apparatus includes a networked computer system, an electronic assembly, and an application program. The networked computer system includes a network, a client computer operatively connected with the network, and a server computer operatively connected with the network. The electronic assembly includes an interface port and an application specific integrated circuit (ASIC). The interface port is configured to connect the client computer with the electronic assembly. The application program is transferred from the network server to the client computer via the network. The application program includes a boundary scan test procedure operative to test operation of the electronic assembly.

According to yet another aspect, a method is provided for remotely testing a peripheral device having an electronic assembly. The method includes the steps of: accessing a network remote site associated with the peripheral device with a host computer; downloading a control program configured to control the electronic assembly and perform a boundary scan operation on the electronic assembly onto the host computer; connecting the host computer with the electronic assembly of the peripheral device via an interface port; and performing a boundary scan operation on the electronic assembly remotely with the host computer.

One advantage of the invention comprises the ability to remotely test electronics within an electronic assembly of a device. Another advantage of the invention is provided by the ability to implement remote testing at a reduced cost.

DESCRIPTION OF THE DRAWINGS

Preferred embodiments of the invention are described below with reference to the following accompanying drawings depicting examples embodying the best mode for practicing the invention.

FIG. 3 is a table of boundary scan signals carried over the interface port and used to control scan changes during boundary scan mode of the formatter board of FIG. 2.

FIG. 4 is a flowchart describing the flow of a computer program implementing the preferred embodiment of the invention.

DETAILED DESCRIPTION OF THE INVENTION

Figure 1:
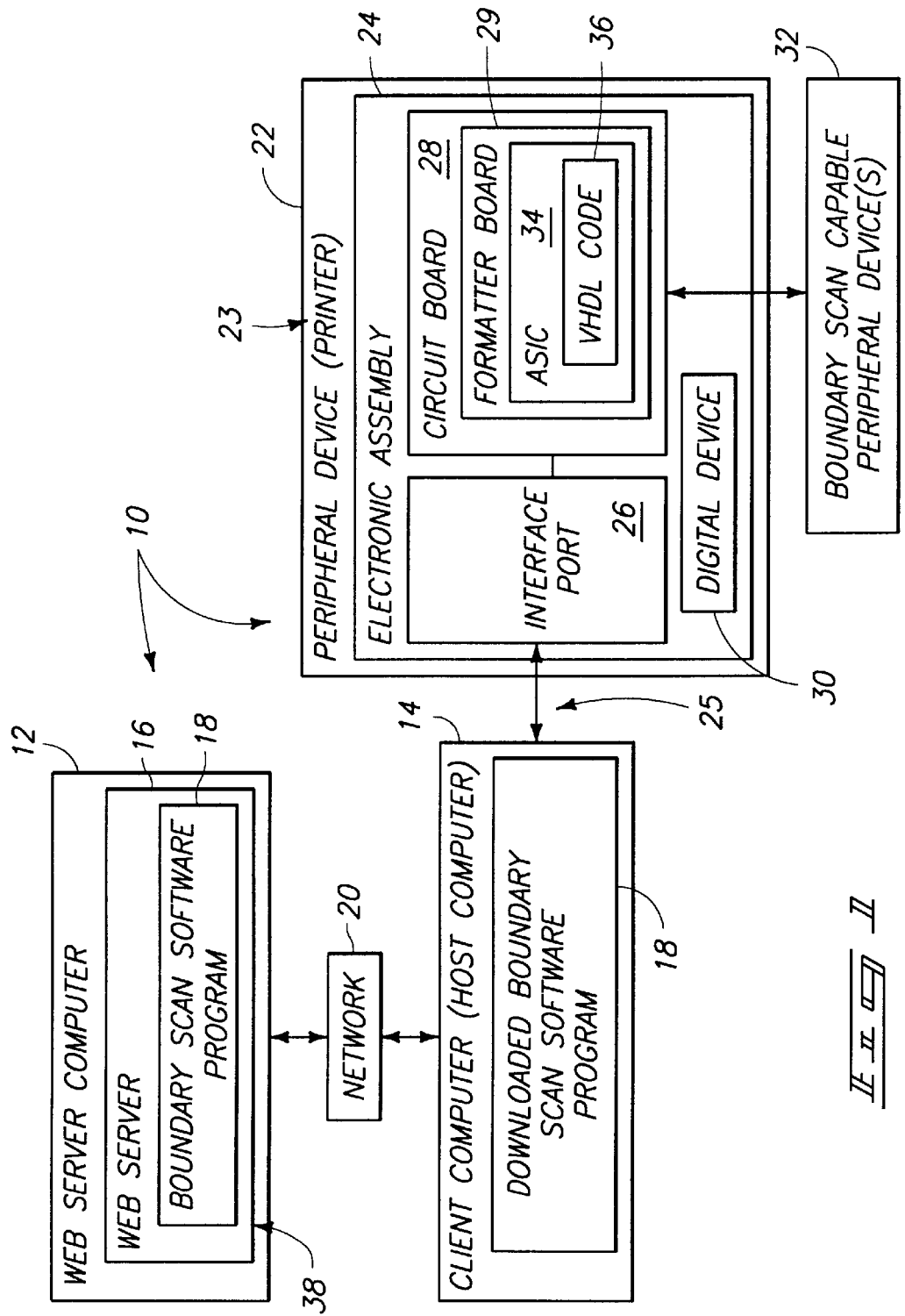
FIG. 1 is a schematic block diagram of a digital component test apparatus utilizing a boundary scan system according to Applicant's invention.

This disclosure of the invention is submitted in furtherance of the constitutional purposes of the U.S. Patent Laws "to promote the progress of science and useful arts". U.S. Constitution, Article 1, Section 8.

For purposes of this disclosure, "Boundary Scan" is understood to include a method of testing electronic assemblies that is a subset of built-in self-test (BIST) methodologies. BIST methodologies allow the diagnostic testing of logic portions of an integrated circuit (IC). Boundary scan allows a piece of test equipment to connect to an electronic assembly and verify that all the digital components are in place, connected, and (to a lesser degree) functioning properly. Accordingly, boundary scan enables verification that all digital components of an electronic assembly are in place, connected, and functioning properly. The full standard is documented as IEEE/ANSI Standard 1149.1-1990, IEEE Standard Test Access Port and Boundary-Scan Architecture, and is sometimes referred to as the JTAG Architecture. The JTAG Architecture enables standardized testing of the connections between integrated circuits (ICs) on a printed circuit board, testing of the individual integrated circuits, and observation of the operation of circuit components during normal operation. Such IEEE/ANSI Standard 1149.1 is herein incorporated by reference as illustrating knowledge presently understood in the art.

Reference will now be made to a preferred embodiment of Applicant's invention. One exemplary implementation is described below and depicted with reference to the drawings comprising a peripheral device in the form of a laser printer such as any one of Hewlett-Packard Company's LaserJet line of laser printers which includes an electronic assembly comprising electronics that require testing. While the invention is described via a preferred embodiment, it is understood that the description is not intended to limit the invention to this embodiment, but is intended to cover alternatives, equivalents, and modifications such as are included within the scope of the appended claims.

Applicant's invention is part of a larger design effort to reduce the need for costly external test equipment on peripheral devices such as LaserJet printers by moving test features into on-board silicon on each peripheral device. Such peripheral devices include electronic components that benefit from the ability to test these components. Continuing reductions in the cost of silicon, along with other changes in the design environment, are making built-in self-test (BIST) features such as Applicant's boundary scan implementation that more attractive. In an effort to prevent obscuring the invention at hand, only details germane to implementing the invention will be described in great detail, with presently understood peripheral details being incorporated by reference as being presently understood in the art.

Several specific advantages are derived by implementing the BIST program of Applicant's invention as described below. First, a reduction of warranty costs and an improvement in customer response time is realized through the ability to remotely test products. Secondly, the ability to manufacture electronic equipment, such as laser printers or LaserJet printers, at factories in developing third world countries is simplified by the provision of hardware with built-in self-test (BIST) capabilities. Thirdly, the ability is provided to sell and service electronics equipment in developing countries or areas, where technical service personnel may be poorly trained.

I. Implementation of One Preferred Embodiment

A. Boundary Scan Mode

FIG. 1 illustrates a preferred embodiment of Applicant's invention wherein a network environment, or networked computer system, is identified with reference numeral 10. Networked computer system 10 includes a web server computer 12, a client (or host) computer 14, and a network 20. A peripheral device 22 is shown in the form of a laser printer. Client computer 14 is enabled with desired testing functionality via network 20 and web server computer 12 so that boundary scan testing can be performed on an electronic assembly 24 of peripheral device 22 via an interface 25.

As shown in FIG. 1, server computer 12 includes a web server 16. Web server 16 comprises a software program that receives, manages and responds to requests for documents and files over the World Wide Web (WWW). Web server 16 includes a boundary scan software program 18 that enables implementation of IEEE/ANSI Standard 1149.1-1990, referred to as IEEE Standard Test Access Port and Boundary-Scan Architecture. According to one construction, server computer 12 comprises a web server computer 12 that is connected to the World Wide Web (WWW). Server 16 comprises a web server including software for enabling connectivity with the World Wide Web. Furthermore, web server 16 provides a peripheral manufacturer's web site 38. For example, where device 22 comprises a LaserJet printer manufactured by Hewlett-Packard Company of Palo Alto, Calif., web site 38 comprises Hewlett-Packard Company's web site "www.hp.com". Accordingly, network 20 comprises a computer network such as the Internet. However, it is understood that network 20 can also be a local area network (LAN), a wide area network (WAN) or any other form of computer network environment.

According to FIG. 1, client computer 14 includes a downloaded copy of boundary scan software program 18 which is retrieved from server computer 12 via network 20. For example, a client can retrieve program 18 from server computer 12 by accessing web site 38 and downloading a copy of program 18 therefrom. Program 18 is then used by client computer 14 via interface 25 to test electronic assembly 24 of peripheral device 22, or in this special case a printer 23.

Electronic assembly 24 of printer 23 includes an interface port 26, a printed circuit board 28 and one or more digital devices 30. Circuit board 28 comprises a formatter board 29 when peripheral device 22 is a printer 23. Digital device 30 can be any of a number of digital devices resident in printer 23. Printed circuit board 24 includes an application specific integrated circuit (ASIC) 34 that contains VHDL code 36 operative to implement a methodology of detecting a boundary scan signature as described below in further detail.

According to one construction, interface port 26 comprises a parallel interface port. Optionally, port 26 can be a Universal Serial Bus (USB) port. Also according to one construction, interface port 26 is a parallel interface port that provides an IEEE 1284 Standard compatible interface. Hence, such implementation provides a methodology for performing IEEE 1149.1 Standard boundary scan through an IEEE 1284 compatible interface.

According to the implementation of FIG. 1, device 22 is a laser printer 23 that includes electronic assembly 24.

Printer 23 includes interface port 26 in the form of a parallel port. In operation, printer 23 will enter boundary scan mode when a boundary scan identification signal is present on parallel port 26. In boundary scan mode, ASIC 34 allows the boundary scan control signals to be controlled through parallel port 26, and the boundary scan control signals then control the behavior of the signals of digital devices 30 in the printer. Additionally, one or more boundary scan capable peripheral devices 32 can be connected with electronic assembly 24 of peripheral device 22. For example, printer 23 can be connected with a flatbed scanner which provides peripheral device 32.

In operation, boundary scan is used to change the configuration of the formatter board 29 via a pass-through operation. A sequence is implemented that allows someone at the client computer to flip into a testing mode regardless of the operating state of the formatter board. This sequence acts as a trigger, and can be used during normal operation of printer 23. Hence, printer 23 can be controllably switched into boundary scan mode. Furthermore, an installed base of hosts, or client computers, can be used to implement boundary scan on printer 23. In operation, ASIC 34 of printer 23 cooperates with program 18 to hot switch parallel port 25 over to boundary scan operation, thereby causing ASIC 34 to behave similar to a state machine.

B. Boundary Scan Identification Signal

Figure 2:
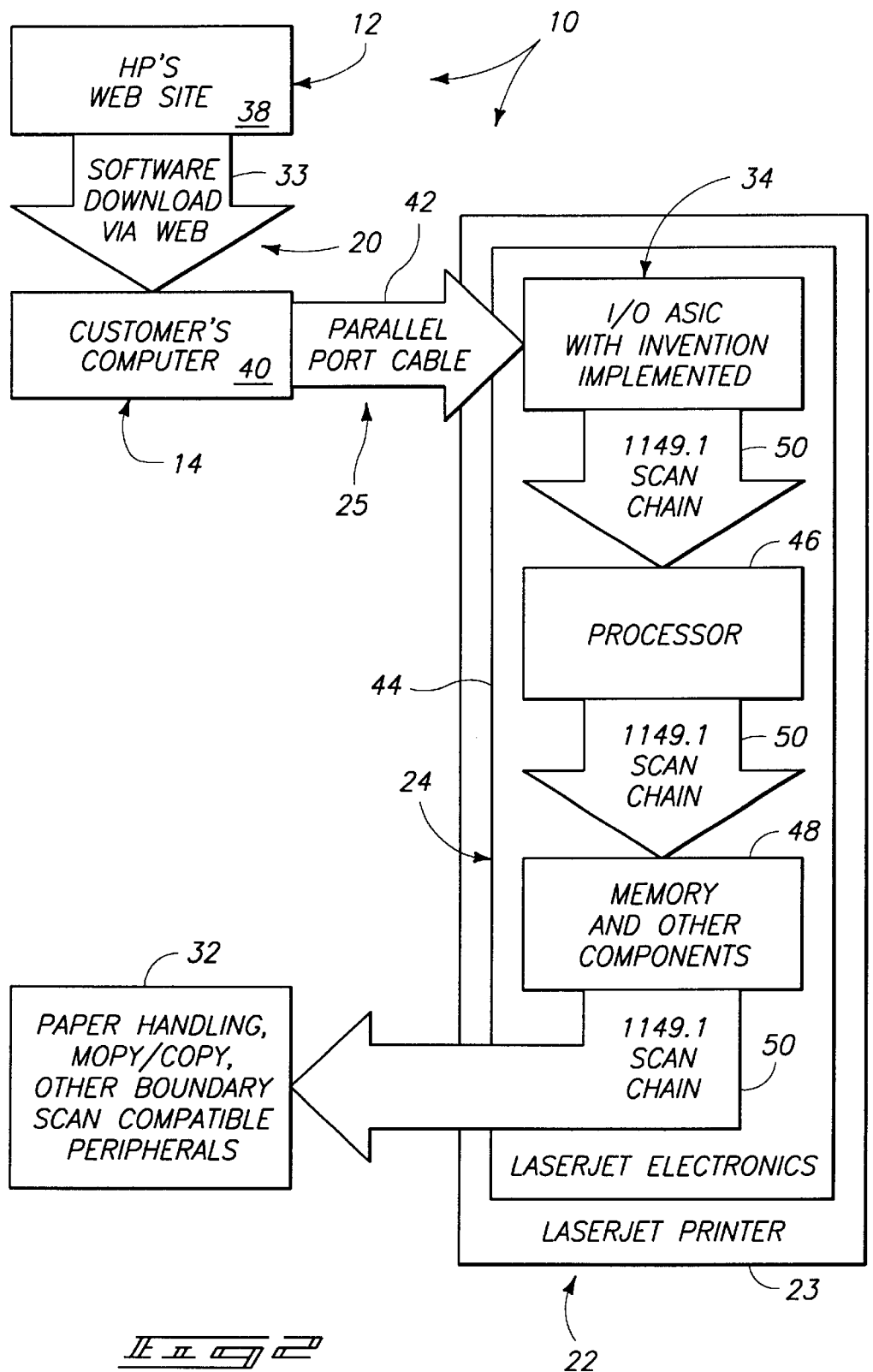
FIG. 2 is a block diagram of a known implementation of the remote digital component testing apparatus for testing electronic assemblies via an interface port of a printer.

FIG. 2 illustrates in greater detail the features of Applicant's invention as shown above with reference to FIG. 1. A peripheral manufacturer's web site 38, here shown as HP's web site, is resident on web server computer 12. A software download 33 is carried out over network 20, here the Internet or World Wide Web (WWW). Software download 33 is received by client computer 14 which is shown as a customer's computer, wherein the customer has purchased peripheral 22 from a peripheral manufacturer.

As shown in FIG. 2, interface 25 is shown as a parallel port cable 42. Cable 25 is signal coupled with ASIC 34 via a plurality of input/output (I/O) pins provided on ASIC 34. ASIC 34 is provided with boundary scan features necessary to perform IEEE/ANSI Standard 1149.1 testing. Electronics 44 are provided on electronic assembly 24, and include ASIC 34, a processor (or processing circuitry) 46, and memory 48. Additionally, other electronic components (not shown) can be provided on electronic assembly 24. An IEEE/ANSI Standard 1149.1 scan chain 50 is implemented on electronic assembly 24, between components 34, 46, 48 and other boundary scan capable, or compatible, peripheral devices 32.

In operation, it is necessary that signals present on parallel port cable 42 during a printer power-up sequence, or during normal operation, not place printer 23 into the boundary scan mode. Such an event would be seen by a user or customer as a system failure.

In order to prevent such signals from initiating boundary scan mode, the following signaling scheme is provided: Step (1) the signaling scheme will begin with the printer in IEEE 1284 compatibility mode; Step (2) the host will raise nSELIN and lower nAUTOFD; Step (3) the host will assert the signal 0101 1010 on data lines 8-0; Step (4) the host will lower nStrobe; Step (5) the host will lower nSELIN for at least 100 uSec and raise it; Step (6) the host will assert the following signals on data lines 8-0. Following each assertion, the host will lower nSELIN for at least 100 uSec and raise it. The design will latch values on the rising edge of nSELIN as shown below with reference to Table 1.

TABLE 1

Parallel Port Input Signaling Scheme

| | |
|---|---|
| 0x0100 1011 | (state 0001) |
| 0x01111 1000 | (state 0010) |
| 0x0110 1001 | (state 0011) |
| 0x0001 1110 | (state 0100) |
| 0x 0000 1111 | (state 0101) |
| 0x0011 1100 | (state 0110) |
| 0x0010 1101 | (state 0111) |
| 0x1101 0010 | (state 1000) |
| 0x1100 0011 | (state 1001) |
| 0x1111 0000 | (state 1010) |
| 0x1110 0001 | (state 1011) |
| 0x1001 0110 | (state 1100) |
| 0x1000 0111 | (state 1101) |
| 0x1011 0100 | (state 1110) |
| 0x1010 0101 | (state 1111) |

(Peripheral Control Word)
(First value to assert onto boundary scan control signals)

It is important that the above signaling scheme not represent a valid IEEE 1284 signaling scheme which could occur during normal operation of the printer. An analysis of this signaling sequence interpreted according to the IEEE 1284 protocol follows below in Items 1–3.

1) The IEEE 1284 protocol specifies that when Step (2) follows Step (1) above, the printer is signaling that it is entering a non-compatibility mode of the parallel port.
2) The specific mode that the port is entering is determined by the data byte present on the data lines in Step (4) above. In this case, the value chosen (1010 1010) is not one of the defined modes in the IEEE 1284 protocol.
3) Further protection is provided by Step (5). Changing the data value while nStrobe is low is a violation of all the protocols.

C. Boundary Scan Signals

When formatter board 29 of laser printer 23 (see FIG. 1) has entered boundary scan mode, the parallel port lines shown in FIG. 3 will be used to control the scan change. The printer ASIC 34 (of FIG. 1) will remap the parallel port lines to the signals indicated in FIG. 3.

The host will leave the DONE signal (see DATA[7] in FIG. 3) low until the boundary scan is complete. At that time, the host will raise the DONE signal, and the system will leave the boundary scan state, perform a reset, and boot normally.

II. Presence of Peripheral Devices

In some cases, peripheral devices with boundary scan capability may be connected to an electronic assembly of a device under test. For example, a scanner may be connected to a laser printer having a formatter board that is under test.

Depending on the site (R&D, manufacturing, field), the formatter may or may not have devices 32 (see FIG. 1) connected to it which are, themselves, boundary scan compatible.

To allow for the boundary scan chain to be extended to these devices, the Peripheral Control Word defined above will be used as follows:

| | |
|---|---|
| Bit 0 | 0 = Device #0 is not present, 1 = Present |
| Bit 1 | 0 = Device #1 is not present, 1 = Present |
| etc. | |

The nature of the devices is printer dependent. Specific devices may include paper handling devices, front panel, disk drives, and/or the printer engine.

FIG. 4 is a logic flow diagram that depicts the logical steps utilized when implementing Applicant's method for remotely testing a peripheral device having an electronic assembly. In Step "S1", the method involves accessing a network remote site associated with the peripheral device with a host computer. After performing Step "S1", the process proceeds to Step "S2".

In Step "S2", the method includes downloading a control program onto the host computer. The control program is configured to control the electronic assembly and to perform a boundary scan operation on the electronic assembly. After performing Step "S2", the process proceeds to Step "S3".

In Step "S3", the method includes connecting the host computer with the electronic assembly of the peripheral device via an interface port. After performing Step "S3", the process proceeds to Step "S4".

In Step "S4", the method includes performing a boundary scan operation on the electronic assembly remotely with the host computer. After performing Step "S4", the process terminates.

III. Code Implementation

The following VHDL code 36 (of FIG. 1) implements the methodology of Applicant's invention, and is part of the disclosure.

```
-----------------------------------------------------------
-- COMPONENT NAME: bscan
--
-- WRITTEN BY: Ken Boorom
--
-- DATE WRITTEN: 12/7/98
--
-- DESCRIPTION: This provides an example of how you can detect a boundary scan
-- signature as described in DFT-20.
--
-- DESCRIPTION OF PROTOCOL:
--         1)  The signaling scheme will begin with the printer in IEEE1284
--         compatibility mode.
--
--         2)  The host will raise nSELIN and lower nAUTOFD.
--
--         3)  The host will assert the signal 0101 1010 on data lines 8–0.
--
--         4)  The host will lower nStrobe.
--
--         5)  The host will assert the following signals on data lines 8–0 for at
--         least 1 msec each:
--
--                 0x0100  1011    (state 0001)
--                 0x0111  1000    (state 0010)
--                 0x0110  1001    (state 0011)
--                 0x0001  1110    (state 0100)
--                 0x0000  1111    (state 0101)
--                 0x0011  1100    (state 0110)
--                 0x0010  1101    (state 0111)
--                 0x1101  0010    (state 1000)-
--                 0x1100  0011    (state 1001)
--                 0x1111  0000    (state 1010)
--                 0x1110  0001    (state 1011)
--                 0x1001  0110    (state 1100)
--                 0x1000  0111    (state 1101)
--                 0x1011  0100    (state 1110)
--                 0x1010  0101    (state 1111)
--
--         6)  The host will raise nStrobe. ASIC will latch the PCW.
--
--         7)  The host asserts the logic value on the data line that corresponds
--         to the first value to be asserted into boundary scan control signals.
--
--         8)  The host lowers and raises nStrobe.
--
--
-----------------------------------------------------------
LIBRARY IEEE;
USE IEEE.std_logic_1164.all;
USE IEEE.std_logic_unsigned.all; -- Enables arithmetic operators on bit
USE IEEE.std_logic_arith.all;
ENTITY bscan is
    PORT
        ( compatibilityMode: IN bit;
            -- Parallel Port Signals that go to pport connector
            nInit:          IN bit;
            nSelectIn:      IN bit;
            nAutoFd:        IN bit;
            nStrobe:        IN bit;
            data:           IN bit_vector (7 DOWNTO 0);
            nFault:         OUT bit;
            -- Parallel Port signals from main ASIC IEEE 1284 State Machine
```

-continued

```
        nFault_main:      IN bit;
        -- Boundary Scan Signals that go to PCB
        TRST:             OUT bit;
        TDO:              IN bit;
        TDI:              OUT bit;
        TMS:              OUT bit;
        TCLK:             OUT bit
    );
END bscan;
ARCHITECTURE Behave of bscan is
    SIGNAL currentStateBits : bit_vector (6 DOWNTO 0);
    SIGNAL currentState : INTEGER RANGE 0 TO 63;
----------------------------------------------------------
--   STATES DEFINED:
--
--   0 = Quiescent
--   16 = Ready to accept first data key on falling nSelectin (key = 01011010)
--   17 = Ready to accept next data key on falling nSelectin (key = 0100 1011)
--   18..31 = Ready to accept keys 3 to 16 on falling nSelectIn
--   32 = Ready to accept PCW on falling nSelectin
--   33 = Boundary scan passthru mode enabled
----------------------------------------------------------
    SIGNAL expected Value : bit_vector (7 DOWNTO 0);
    SIGNAL pcw: bit_vector (7 DOWNTO 0);
    SIGNAL boundaryScanActive : bit;
BEGIN
    CurrentStateBits < = To_bitvector (CONV_STD_LOGIC_VECTOR (currentState, 6));
    expectedValue (0) < = currentStateBits (0);
    expectedValue (1) < = NOT currentStateBits (1);
    expectedValue (2) < = currentStateBits (2);
    expectedValue (3) < = NOT currentStateBits (3);
    expectedValue (4) < = NOT currentStateBits (0);
    expectedValue (5) < = currentStateBits (1);
    expectedValue (6) < = NOT currentStateBits (2);
    expectedValue (7) < = currentStateBits (3);
    boundaryScanActive < = '1' WHEN currentState = 31 ELSE '0';
    TDI < = data (0) WHEN boundaryScanActive = '1' ELSE '0';
    TCLK < = data (1) WHEN boundaryScanActive = '1' ELSE '0';
    TMS < = data (2) WHEN boundaryScanActive = '1' ELSE '0';
    TRST < = data (3) WHEN boundaryScanActive = '1' ELSE '0';
    nFault < = TDO WHEN boundaryScanActive = '1' ELSE nFault_main;
--  State machine timed on nSelectin
PROCESS (nSelectIn)
    BEGIN
        IF (nSelectIn'EVENT and nSelectIn = '1') THEN -- Rising edge
           -- If strobe or AutoFd go high, return to state 0
           IF (nStrobe = '1' OR nAutoFd = '1') THEN
              currentState < = 0;
           ELSE
              -- State zero transitions to 16 on above condition being satisfied plus
              -- compatibilityMode being 1
              IF currentState = 0 THEN
                 IF (compatibilityMode = '1') THEN
                    currentState < = 16;
                 END IF;
              ELSE
                 -- In the 15-state count sequence (states 16, 17...31) we transition when
                 -- data lines are at correct values.
                    IF currentStateBits (6) = '0' THEN
                       IF data = expectedValue THEN
                          currentState < = currentState + 1;
                       ELSE
                          currentState < = 0;                -- Go directly to state 0 on failure.
                       END IF;
                    ELSE
                       -- We are in state 32 or higher. Just keep incrementing
                          currentState < = currentState + 1;
                    END IF;   -- currentState(6) = '0'
              END IF;   -- currentState = 0
           END IF;   -- (nstrobe = "1"....)
        END IF;   -- (nSelectIn'EVENT)
END PROCESS;
-- Latch PCW on state 32
PROCESS (nSelectIn)
    BEGIN
        IF (nSelectIn'EVENT and nSelectIn = '1')   THEN -- Rising edge
           IF currentState = 32 THEN
              pcw < = data;
           ELSE
```

```
        pcw < = pcw;
    END IF;
  END IF;
END PROCESS;
END Behave;
```

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A digital component test apparatus, comprising:
    a network environment;
    a client computer operatively connected with the network environment;
    a server computer operatively connected with the network environment;
    a device having an electronic assembly and an interface port, the electronic assembly including processing circuitry and a scan chain, and the interface port configured to connect the client computer with the electronic assembly and the device configured to implement a signaling scheme that does not place the device into a boundary scan mode during a power-up sequence or normal operating mode of the device; and
    an application program that is transferred from the network server to the client computer via the network and implemented on the client computer, the application program comprising a boundary scan test procedure that generates boundary scan signals according to an IEEE 1284 protocol operative to test operation of the electronic assembly while in a test mode of the device;
    wherein the interface port comprises a parallel interface port through which boundary scan is performed between the client computer and the peripheral device.

2. The apparatus of claim 1 wherein the server computer includes a hypertext markup language (HTML) file resident at an Internet protocol (IP) address, and wherein the application program is provided in the HTML file.

3. The apparatus of claim 1 wherein the server computer comprises a web server, the application program comprises a boundary scan software program, and the boundary scan software program is resident on the web server.

4. The apparatus of claim 1 wherein the device comprises a computer peripheral device, the interface port comprises a parallel interface port, and further comprising a parallel port cable connected with the parallel interface port and providing signal communication between the client computer and the computer peripheral device.

5. The apparatus of claim 1 wherein the device comprises an electronic assembly including electronics.

6. The apparatus of claim 5 wherein the device comprises a printer and the electronics comprises an application specific integrated circuit (ASIC), a processor, and memory, and wherein the ASIC includes VHDL code.

7. The apparatus of claim 1 wherein the application program comprises a JAVA application containing test software, the server computer comprises a web server, and the network environment comprises the Internet, and wherein the JAVA application is downloaded from the web server through the Internet.

8. The apparatus of claim 7 wherein the device comprises a printer, wherein the JAVA application enables a client to download the test software from the host web server through the Internet, and wherein the printer can be tested from a web page posted on the web site.

9. The apparatus of claim 1 wherein the application program implements boundary scan on the electronic assembly to enable remote field testing of the device.

10. An apparatus for testing electronic assemblies, comprising:
    a networked computer system including a network, a client computer operatively connected with the network, and a server computer operatively connected with the network;
    an electronic assembly including an interface port and an application specific integrated circuit (ASIC), the interface port configured to connect the client computer with the electronic assembly, and the electronic assembly configured to implement a signaling scheme that does not place the electronic assembly into a boundary scan mode during a power-up sequence or normal operating mode of the electronic assembly; and
    an application program that is transferred from the network server to the client computer via the network and implemented on the client computer, the application program comprising a boundary scan test procedure operative to test operation of the electronic assembly while the electronic assembly is in a test mode to generate boundary scan signals according to an IEEE 1284 protocol;
    wherein the interface port comprises a parallel interface port through which boundary scan is performed between the client computer and the peripheral device.

11. The apparatus of claim 10 further comprising a peripheral device communicating with the electronic assembly, the peripheral device capable of performing a boundary scan.

12. The apparatus of claim 10 wherein the electronic assembly is provided on a peripheral device and the electronic assembly further includes a circuit board on which the ASIC is provided.

13. The apparatus of claim 12 wherein the peripheral device comprises a printer.

14. A method for remotely testing a peripheral device having an electronic assembly, comprising the steps of:
    accessing a network remote site associated with the peripheral device with a host computer;
    downloading a control program configured to control the electronic assembly and perform a boundary scan operation on the electronic assembly, the control program implemented on the host computer in a test mode to generate boundary scan signals according to an IEEE 1284 protocol;

connecting the host computer with the electronic assembly of the peripheral device via a parallel interface port;

suppressing a normal operating mode of the electronic assembly to provide a test mode; and performing a boundary scan operation on the electronic assembly remotely with the host computer.

15. The method of claim 14 wherein the interface port comprises a parallel port connector provided on the electronic assembly.

16. The method of claim 15 wherein an IEEE 1284 standard signaling scheme is used to communicate over the parallel port connector between the host computer and the electronic assembly.

17. The method of claim 14 wherein the peripheral device comprises a laser printer and the interface port comprises a parallel communication port, and wherein a boundary scan identification signal is presented to the printer via the parallel communication port.

18. The method of claim 17 wherein the boundary scan identification signal does not represent a valid IEEE 1284 signaling scheme capable of occurring during a normal printer operation.

19. A digital component test apparatus, comprising:

a network environment;

a client computer operatively connected with the network environment;

a server computer operatively connected with the network environment;

a device having an electronic assembly and an interface port, the electronic assembly including processing circuitry and a scan chain, and the interface port configured to connect the client computer with the electronic assembly and the device configured to implement a signaling scheme that does not place the device into a boundary scan mode during a power-up sequence or normal operating mode of the device; and an application program that is transferred from the network server to the client computer via the network and implemented on the client computer, the application program comprising a boundary scan test procedure that generates boundary scan signals according to an IEEE 1284 protocol operative to test operation of the electronic assembly while in a test mode of the device;

wherein the interface port comprises a parallel interface port through which boundary scan is performed between the client computer and the device.

20. An apparatus for testing electronic assemblies, comprising:

a networked computer system including a network, a client computer operatively connected with the network, and a server computer operatively connected with the network;

an electronic assembly including a parallel interface port and an application specific integrated circuit (ASIC), the interface port configured to connect the client computer with the electronic assembly, and the electronic assembly configured to implement a signaling scheme that does not place the electronic assembly into a boundary scan mode during a power-up sequence or normal operating mode of the electronic assembly; and an application program that is transferred from the network server to the client computer via the network and implemented on the client computer, the application program comprising a boundary scan test procedure that generates boundary scan signals according to an IEEE 1284 protocol and is operative to test operation of the electronic assembly while the electronic assembly is in a test mode.

* * * * *